(12) United States Patent

MacTiernan et al.

(10) Patent No.: US 12,586,366 B1
(45) Date of Patent: Mar. 24, 2026

(54) ARTIFICIAL INTELLIGENCE BASED CONTENT DETECTION

(71) Applicant: Amazon Technologies, Inc., Seattle, WA (US)

(72) Inventors: Daniel Neil MacTiernan, Ocean City, NJ (US); Katherine Goodrich, New Haven, CT (US); Aaron Sahagun, Pleasant Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 18/488,489

(22) Filed: Oct. 17, 2023

(51) Int. Cl.
*G06V 10/82* (2022.01)
*G06Q 30/0241* (2023.01)
*G06V 10/774* (2022.01)
*G06V 30/19* (2022.01)

(52) U.S. Cl.
CPC ......... *G06V 10/82* (2022.01); *G06Q 30/0277* (2013.01); *G06V 10/774* (2022.01); *G06V 30/1916* (2022.01); *G06V 30/19173* (2022.01); *G06V 2201/10* (2022.01)

(58) Field of Classification Search
None
See application file for complete search history.

(56) References Cited

U.S. PATENT DOCUMENTS

| | | | |
|---|---|---|---|
| 11,853,708 B1* | 12/2023 | Connor ................. | G06F 40/253 |
| 2021/0256160 A1* | 8/2021 | Hachey ................. | G06N 20/20 |
| 2022/0309332 A1* | 9/2022 | V V Ganeshan ..... | G06F 40/232 |
| 2023/0063913 A1* | 3/2023 | Balaji .................... | G06N 3/045 |
| 2023/0222775 A1* | 7/2023 | Stonehouse .......... | G06K 7/1413 |
| | | | 382/159 |

* cited by examiner

*Primary Examiner* — Edward Park
(74) *Attorney, Agent, or Firm* — Knobbe, Martens, Olson & Bear, LLP

(57) ABSTRACT

The AI detection system processes content. The AI detection system extracts text with optical character recognition technology. A machine learning model is applied to the text to determine a likelihood of whether the text was generated by AI. A machine learning model is applied to the text to determine a likelihood whether the text includes a flaggable claim. A machine learning model can be applied to the image to determine a likelihood of whether the image was generated by AI. The AI detection system causes an indicator, such as a warning, to also be presented to the user computing device that received the content.

20 Claims, 6 Drawing Sheets

ARTIFICIAL INTELLIGENCE BASED CONTENT DETECTION

BACKGROUND

Generative artificial intelligence (AI) can produce various types of content, including text, images, video, and audio. Generative AI makes use of a machine learning model that learns the patterns and/or structure of input training data and in order to generate potentially new, related data. Some models, such as transformer-based deep neural networks, enable systems to accept natural language prompt(s) as input and output a natural language response. Some models enable systems to accept natural language prompt(s), image(s), audio, and/or video as input and output a generated image, text, audio, or video.

BRIEF DESCRIPTION OF THE DRAWINGS

These and other features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
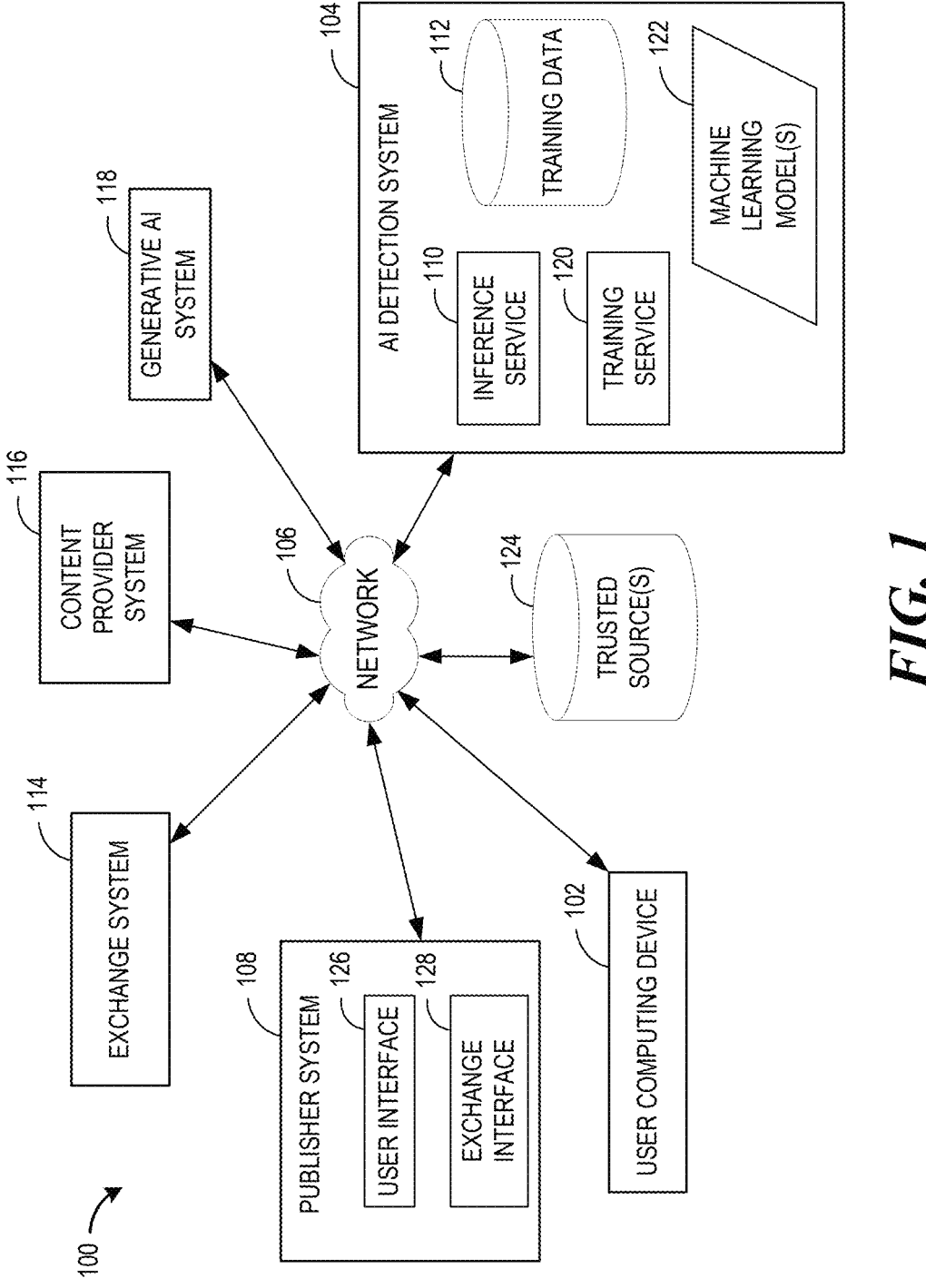
FIG. 1 is a schematic block diagram depicting an illustrative network environment for artificial intelligence based content detection.

With recent advances in generative AI technology, it is easier than ever to create content. Some actors may employ generative AI to create content that is tailored for a user, unauthorized, false, and/or factually misleading. In some situations, content providers provide content to publishers for publishing in a programmatic manner with little to no oversight or review. For example, in an advertising context, a publisher side platform can request bids for impressions via an exchange and content providers can bid on the requests via the exchange to publish their content. Accordingly, content publishers are especially at risk since content providers can now (with little to no effort) generate and provide voluminous amounts of varied content for distribution, which can be technically challenging for content distributors to effectively identify, label, monitor, and/or block with existing technology.

Generally described, aspects of the present disclosure are directed to systems and methods to detect and/or label content as potentially generated by AI and/or flagged. An artificial intelligence detection system can indirectly receive content from a content provider. Content can include an image, text, markup, audio, and/or video. The content can also be associated with a category provided by the content provider. The AI detection system can process the content. The AI detection system can extract text from the content. For example, in the case of image content, the AI detection system can extract text with optical character recognition (OCR) technology. A machine learning model can be applied to the text to determine a likelihood of whether the text was generated by AI. A machine learning model can be applied to the text to determine a likelihood whether the text contains a flaggable claim, such as, but not limited to, a false, factually misleading, or an opinion claim. Moreover, in the image content case, a machine learning model can be applied to the image to determine a likelihood of whether the image was generated by AI. The AI detection system can derive one or more categories or sub-categories for the content, such as, but not limited to, "Food & Drink," "Coffee/Tea," "Style & Fashion," "Clothing," "Technology & Computing," "PC Support." etc. The AI detection system, with natural language processing, can determine whether the derived category matches the provided category for the content. Based on the inference results, such as, but not limited to, a likelihood that the content was generated by AI, the likelihood that the content contains a flaggable claim, and/or a determined category mismatch, the AI detection system can cause an indicator, such as a warning, to also be presented to the user computing device that received the content. Based on the inference results, the AI detection system can also automatically block the content and/or flag the content for additional review.

AI generated content only exists because of computer technology. Therefore, the systems and methods described herein related to AI-generated content detection may be inextricably tied to computer technology. The systems and methods described herein may also improve image, audio, video, markup, and/or text detection performance. As described herein, it can be desirable to block or flag certain content (such as image, audio, video, markup, and/or text content) if the content was generated by AI or contains a flaggable claim. One approach to blocking or identifying such content can be for a system to check a content blacklist. The content blacklist can include a list of content or content identifiers (such as a hash of the content) that identifies prohibited content. Accordingly, under such a system, checking a blacklist (there could be multiple blacklists) can take O(n) time where n is the number of content items in the blacklist. The systems and methods described herein can take an alternative approach by instead checking content with one or more machine learning models that determine a probability that the content was generated by AI or contains a flaggable claim. The systems and methods described herein can improve content detection performance because the amount of computing resource usage may be limited by the complexity of the models and number of machine learning models employed (which may be a fixed number) instead of checking O(n) times for each blacklist, which can use considerably more resources than machine learning prediction. Therefore, the systems and methods described herein can improve content detection performance by using fewer computing resources than other approaches. As used herein, the term "computing resource" can refer to a physical or virtual component of limited availability within a computer system. Computing resources can include, but are not limited to, computer processors, processor cycles, and/or memory.

Turning to FIG. 1, an illustrative network environment 100 for AI based content detection is described. The components of the network environment 100 can analyze content and determine a likelihood that the content was AI-generated and/or contains a flaggable claim, which were not available in some existing systems. The network environment 100 may include one or more user computing devices 102, a publisher system 108, an exchange system 114, a content provider system 116, a generative AI system 118, and the AI detection system 104. The AI detection system 104 may include an inference service 110, a training service 120, training data 112, and one or more machine learning models 122.

The publisher system 108, which also can be referred to as a supply-side platform (SSP), can allow content providers to publish content (such as an advertisement). In particular, the publisher system 108 can make content available to user computing devices 102 via a user interface 126. User computing devices 102 can include, but are not limited to, a laptop or tablet computer, workstation, personal computer, personal digital assistant (PDA), hybrid PDA/mobile phone, smart wearable device (such as a smart watch), mobile phone, and/or a smartphone. The publisher system 108 can include an electronic catalog system.

The electronic catalog system may include or be in communication with a data store of information about items that may be listed for sale, lease, etc. by an electronic marketplace, sellers, merchants and/or other users. The item information in this data store may be viewable, in the user interface 126, by end users through a browsable or searchable electronic catalog in which each item may be described in association with a network page, such as an item detail page. Each item detail page may include, for example, an item image and description, content (such as advertisements), customer ratings, customer and professional reviews, sales rank data, lists of related items, and/or other types of supplemental data that may assist consumers in making informed acquisition decisions. A network page can be provided that enables users to interact with items, such as selecting, acquiring, or consuming items (such as watching or playing a media content item). Users of the system may, in some embodiments, locate specific item detail pages within the electronic catalog by executing search queries, navigating a browse tree, and/or using various other navigation techniques. The electronic catalog system can also present content (such as advertisements) in search results, in home pages, etc.

An item can refer to a data object that can represent a specific thing that has a number of definable attributes. For example, an item can represent things such as, but not limited to, a physical product, a digital product, and/or an electronic document. Example items can be music albums, audiobooks, books, movies, television shows, and/or other media products in either an electronic format or physical format. Example items can also be electronic or digital, such as an electronic service or any electronic content provided by a buyer to a seller in which a physical good is not transferred. Users can interact with items. For example, a user can select an item in a user interface to view details about the item. A user can acquire an item. Acquiring an item can refer to consuming an item, such as by watching a movie or listening to a music album.

The publisher system 108 can communicate with the exchange system 114 via an exchange interface 128. In some embodiments, the publisher system 108 can employ programmatic advertising. Under programmatic advertising, there can be indirect transactions where the publisher, if it doesn't sell enough direct advertisements itself, can offer its supply to indirect demand sources in an open auction exchange via the exchange system 114. Advertisers can compete in the auction on price and if publisher decides to offer a content slot for bidding, it notifies the exchange system 114 of the transaction, accepts a bid, and the winning ad server delivers content to render via the publisher system 108.

Content providers, via respective content provider systems 116 and the exchange system 114, can make bids on content slots. As described herein, a content provider can generate content with a generative AI system 118. In some embodiments, the content provider can generate content that is customized for a particular user profile. In some cases, a user profile, without any personal identifying information, can be associated with an identifier, such as, but not limited to, a cookie identifier, an IP address, a hardware address, etc. When a user browses different network pages and the user opts into targeted advertising features, the content provider system 116 can receive some information (such as geolocation data, recent purchases, recent navigation data) about the user profile associated with an identifier (such as a cookie identifier, IP address, etc.). The content provider system 116 can use the information associated with the user profile and generative AI to generate content tailored for the user profile.

In the AI detection system 104, the training service 120 can train one or more machine learning models 122 with training data 112. In some embodiments, the training data 112 can include a corpus of text with training labels. The training labels can be assigned by machine learning analysts. Some of the training data can be obtained from a trusted source 124, such as a network accessible encyclopedia, a peer-reviewed research repository, and/or a repository of data with verifiable content credentials. Some training labels can indicate true claims, false claims, misleading claims, or opinion claims associated with particular text from the text training corpus. In some embodiments, the training data can include images, video, audio, and/or text data. Training labels for images, video, audio, markup data, and/or text data can indicate whether the respective content was generated by AI or was not generated by AI.

Content credentialled data can follow an industry standard for provenance metadata, such as, but not limited to, the Content Authenticity Initiative. Each file, such as, an image file, a video file, an audio file, a markup file, or a text file, can be associated with a content credential, which can include metadata. The metadata can include, but is not limited to, the publisher of the file, the device used to record the file data, the location and time of the recording, and/or editing steps that altered the file. The metadata can be secured with a hash code and/or a certified digital signature. The industry standard can include methods and algorithms for verifying the content credentials. In some cases, a third party may provide a library for performing the content credential verification.

The trained machine learning models 122 can include deep neural networks. In some embodiments, a natural language processing model (which can classify text and/or assign a probability for a text classification for one or more of the following categories: true, false, misleading, opinion, AI generated, or not AI generated) can include, but is not limited to, a Bidirectional Encoder Representations from Transformers (BERT). In some embodiments, an image, video, or audio identification model (which can classify an image, video, or audio and/or assign a probability for an image, video, or audio classification for one or more of the following categories: AI generated or not AI generated) can include, but is not limited to, a convolutional neural network (CNN) and/or a recurrent neural network (RNN).

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

In some embodiments, the AI detection system 104 can be implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
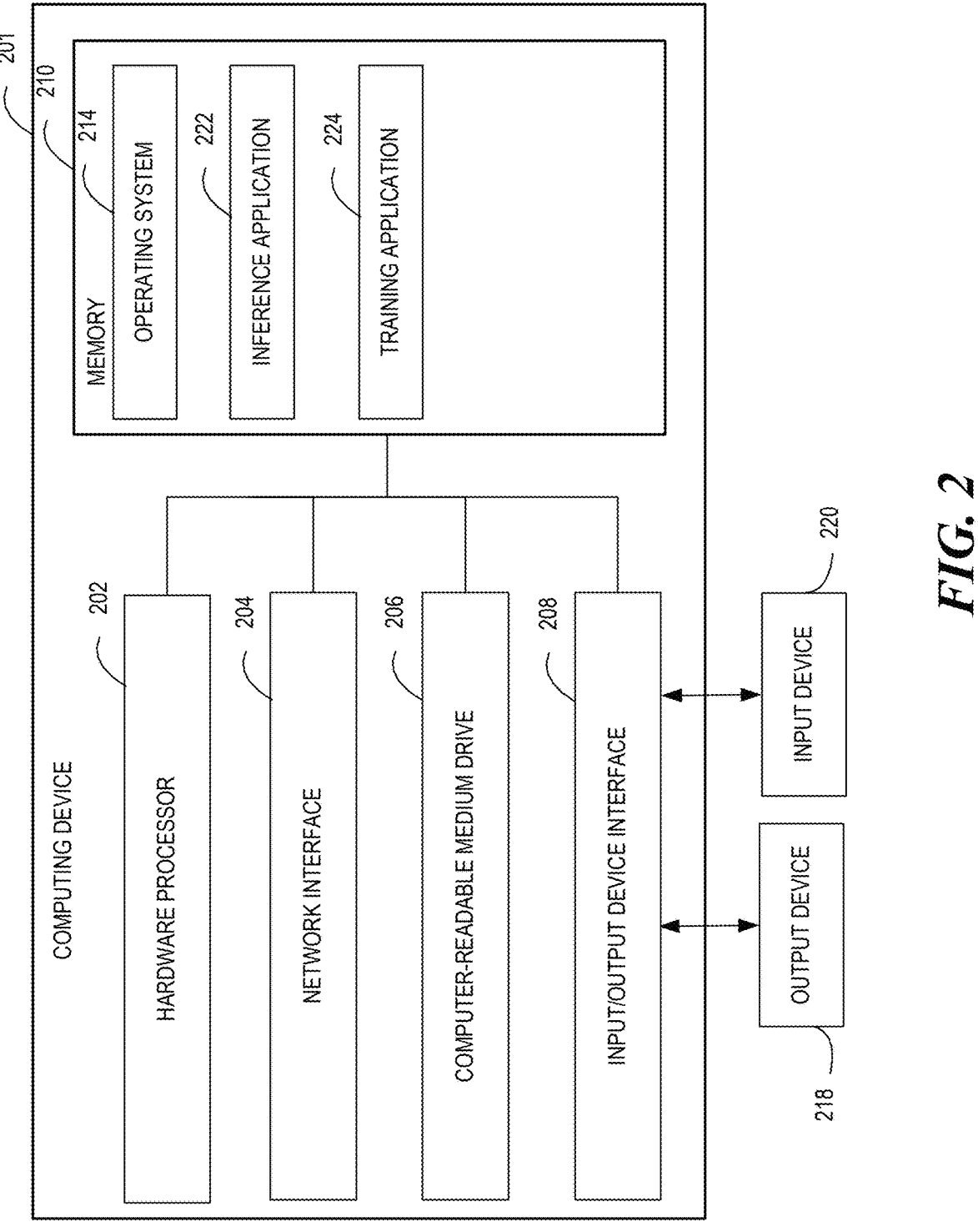
FIG. 2 is a schematic block diagram depicting an illustrative general architecture of a computing system.

FIG. 2 is a schematic diagram of an illustrative general architecture of a computing device 201 for implementing aspects of the AI detection system 104 referenced in the environment 100 in FIG. 1. As described herein, the AI detection system 104 can detect and identify potentially AI-generated content and/or determine a likelihood that content contains a flaggable claim or a lack thereof. The computing device 201 includes an arrangement of computer hardware and software components that may be used to execute the inference application 222 and/or the training application 224. The general architecture of FIG. 2 can be used to implement other devices described herein, such as the user computing devices 102 referenced in FIG. 1. The computing device 201 may include more (or fewer) components than those shown in FIG. 2. Further, other computing systems described herein may include similar implementation arrangements of computer hardware and/or software components.

The computing device 201 for implementing aspects of the AI detection system 104 may include a hardware processor 202, a network interface 204, a non-transitory computer-readable medium drive 206, and an input/output device interface 208, all of which may communicate with one another by way of a communication bus. As illustrated, the computing device 201 is associated with, or in communication with, an output device 218 and an input device 220. The network interface 204 may provide the computing device 201 with connectivity to one or more networks or computing systems. The hardware processor 202 may thus receive information and instructions from other computing systems or services via the network 106. The hardware processor 202 may also communicate to and from memory 210 and further provide output information (such as audio data) for the output device 218, such as a speaker, via the input/output device interface 208. The input/output device interface 208 may accept input from the input device 220, such as a microphone, video camera, keyboard, mouse, digital pen, and/or touch screen.

The memory 210 may contain specifically configured computer program instructions that can be executed by the hardware processor 202. The memory 210 generally includes RAM, ROM and/or other persistent or non-transitory computer-readable storage media. The memory 210 may store an operating system 214 that provides computer program instructions for use by the hardware processor 202 in the general administration and operation of the computing device 201.

The memory 210 may include the inference application 222 and/or the training application 224 that may be executed by the hardware processor 202. In some embodiments, the inference application 222 and/or the training application 224 may implement various aspects of the present disclosure. As described herein, the training application 224 can train the one or more machine learning models 122 with the training data 112. The inference application 222 can receive new content (such as an advertisement). The inference application 222 can process the new content, such as by extracting text from an image, audio, or markup content. The inference application 222 can apply a trained machine learning model to text and determine a likelihood that the text content contains a flaggable claim or a lack thereof. For each type of content, such as, image, video, audio, markup, or text content, the inference application 222 can apply a trained machine learning model to the content and receive a likelihood whether the content was generated by AI.

Figure 3:
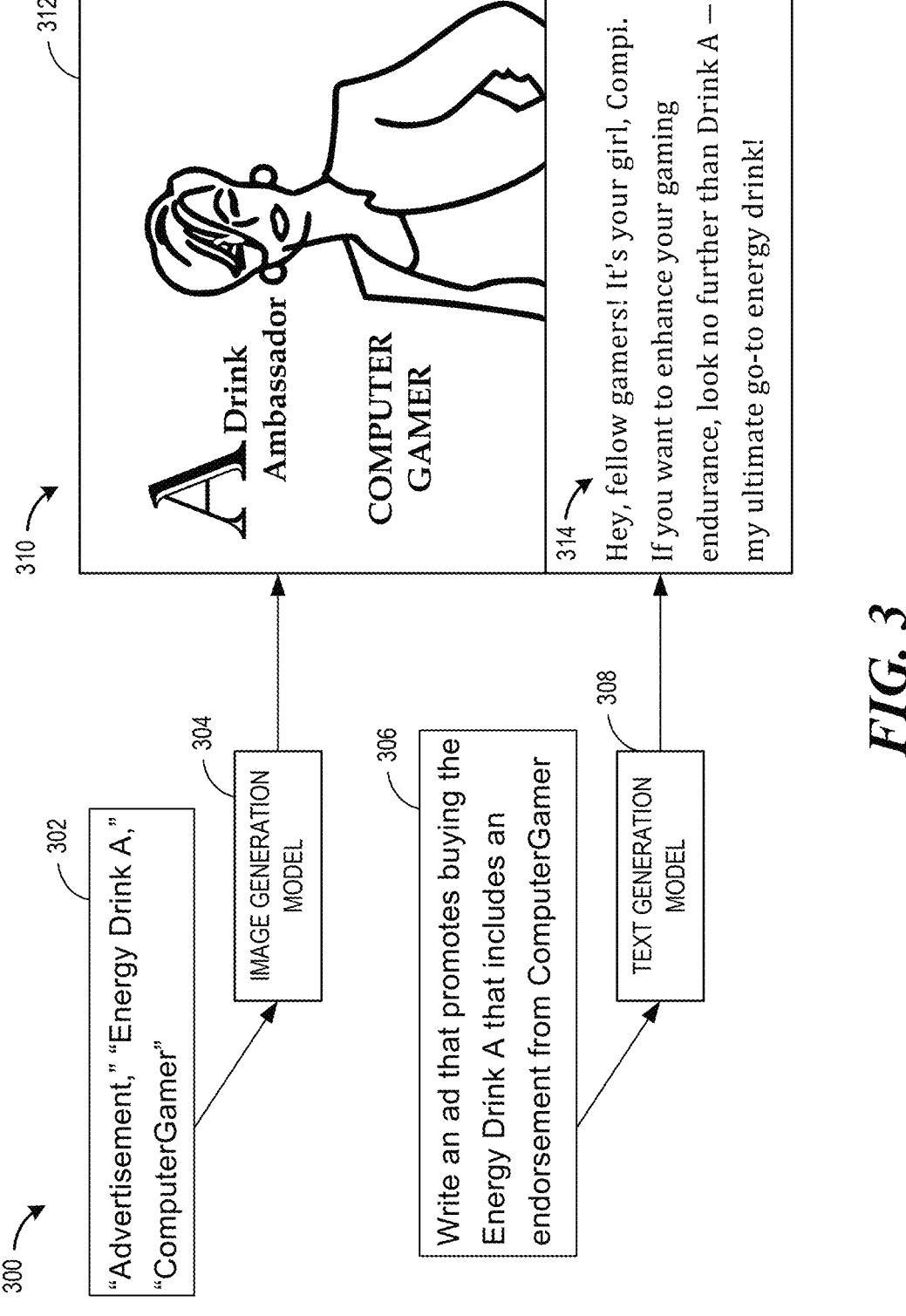
FIG. 3 depicts a methodology for generating content with AI.

FIG. 3 depicts a methodology 300 for generating the content 310 with AI. A content provider can generate the content with one or more generative AI systems 118. As described herein, it can be technically challenging for content distributors to effectively identify, label, monitor, and/or block content with existing technology. Accordingly, the AI detection system 104 can process the content 310 to determine a likelihood that the content 310 was generated by AI and/or determine a likelihood that content 310 contains a flaggable claim or a lack thereof.

A content provider can use an image generation model 304 to generate a first image 312 for the content 310. As shown, the image generation model 304 can receive a first text prompt 302 (here the input text "Advertisement," "Energy Drink A." and "ComputerGamer") and output the first image 312 in response to receiving the input prompt 302. In other embodiments, the first image 312 can be manually created in a graphics editing software application. The content provider can use a text generation model 308 to generate the text 314. As shown, the text generation model 308 can receive a second text prompt 306 (here the input text "Write an ad that promotes buying the Energy Drink A that includes an endorsement from ComputerGamer") and output the generated text 314 (here "Hey, fellow gamers! It's your friend, Compi. If you want to enhance your gaming endurance, look no further than Drink A—my ultimate go-to energy drink!") in response to the input prompt 306. The content provider can combine the first image 312 and the generated text 314 to result in the content 310, which itself can be an image. In other cases, the content provider can combine the first image 312 and the generated text 314 to result in the generated content 310 in a markup language, such as, but not limited to, HyperText Markup Language (HTML). The content 310 that uses the name and likeness of a celebrity (here "ComputerGamer") may be unauthorized. As described herein, if the content provider wins an auction, the content provider can provide the content 310 to be published in the user interface 126 of the publisher system 108.

Figures 4A, 4B:
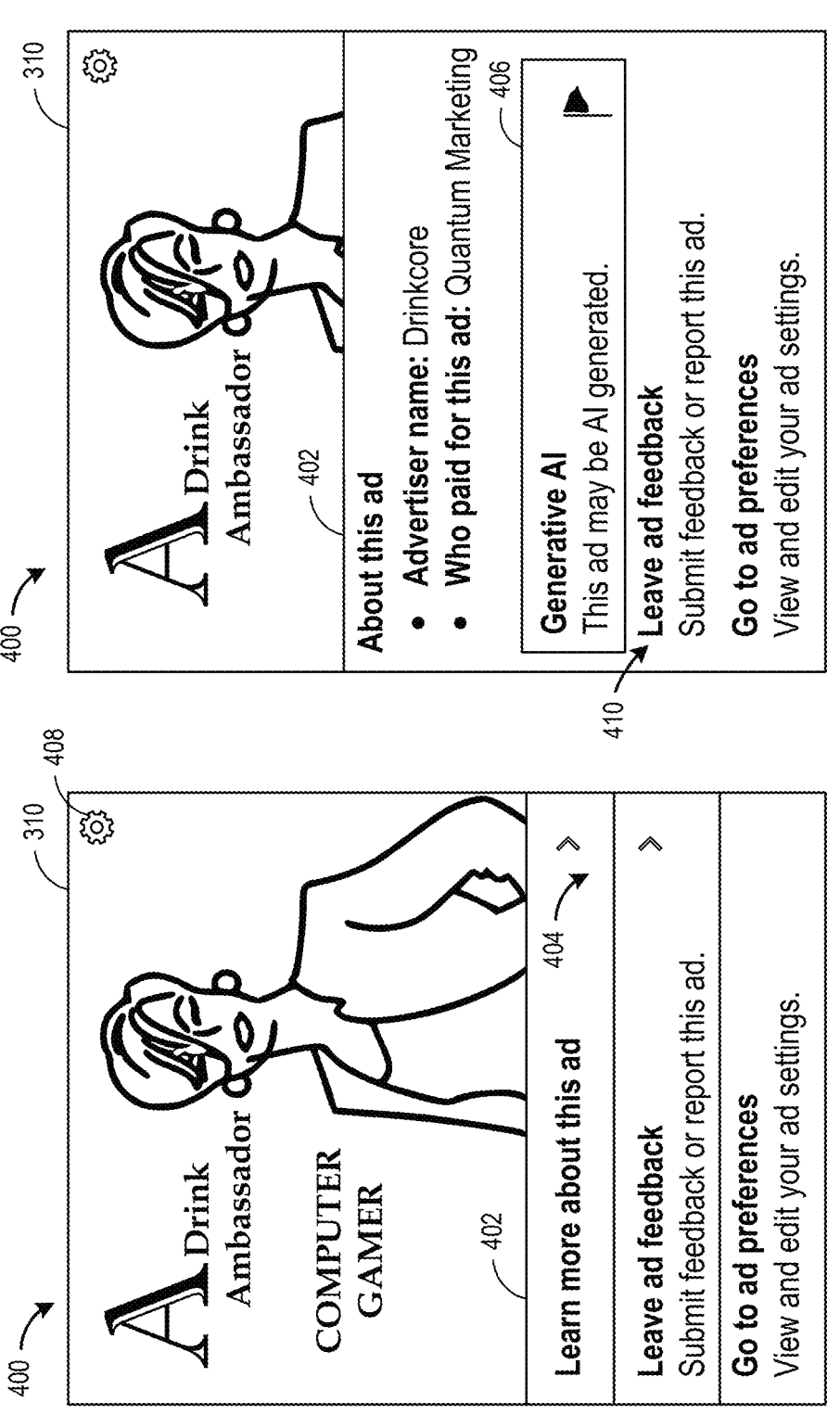
FIGS. 4A-4B depict a graphical user interface of a publisher system.

FIGS. 4A-4B depict a graphical user interface 400 of the publisher system 108. As described herein, the AI detection system 104 can process content to determine a likelihood that the content was potentially generated by AI and/or determine a likelihood that the content contains a flaggable claim or a lack thereof. Based on the results from the AI detection system 104, the publisher system 108 can present one or more indicators in a graphical user interface, which can alert a user that content may have been generated by AI and/or may contain a flaggable claim.

In FIG. 4A, as shown, the graphical user interface 400 can present the content 310 referenced in FIG. 3. The graphical user interface 400 can include a content options area 402. In some embodiments, a user viewing the content 310 can select a settings user interface element 408 to view the content options area 402. The content options area 402 can include a user interface element 404, which if selected can cause the graphical user interface 400 to present additional data regarding the content 310.

In FIG. 4B, the content options area 402 in the graphical user interface 400 can present additional data regarding the content 310. The additional data can include a warning indicator 406. As shown, the warning indicator 406 can indicate that the content 310 may have been generated by AI. As described herein, the AI detection system 104 can process the content 310 determine a likelihood that the content 310 was potentially generated by AI and/or determine a likelihood that the content 310 contains a flaggable claim or a lack thereof. While not shown, an additional warning indicator in the graphical user interface 400 can present a warning that the advertisement may contain a flaggable claim. Also, as described herein, a user can use the feedback element 410 to report other advertisements as possibly containing a flaggable claim, possibly being generated by AI, possibly being custom generated content, and/or possibly being unauthorized.

Figure 5:
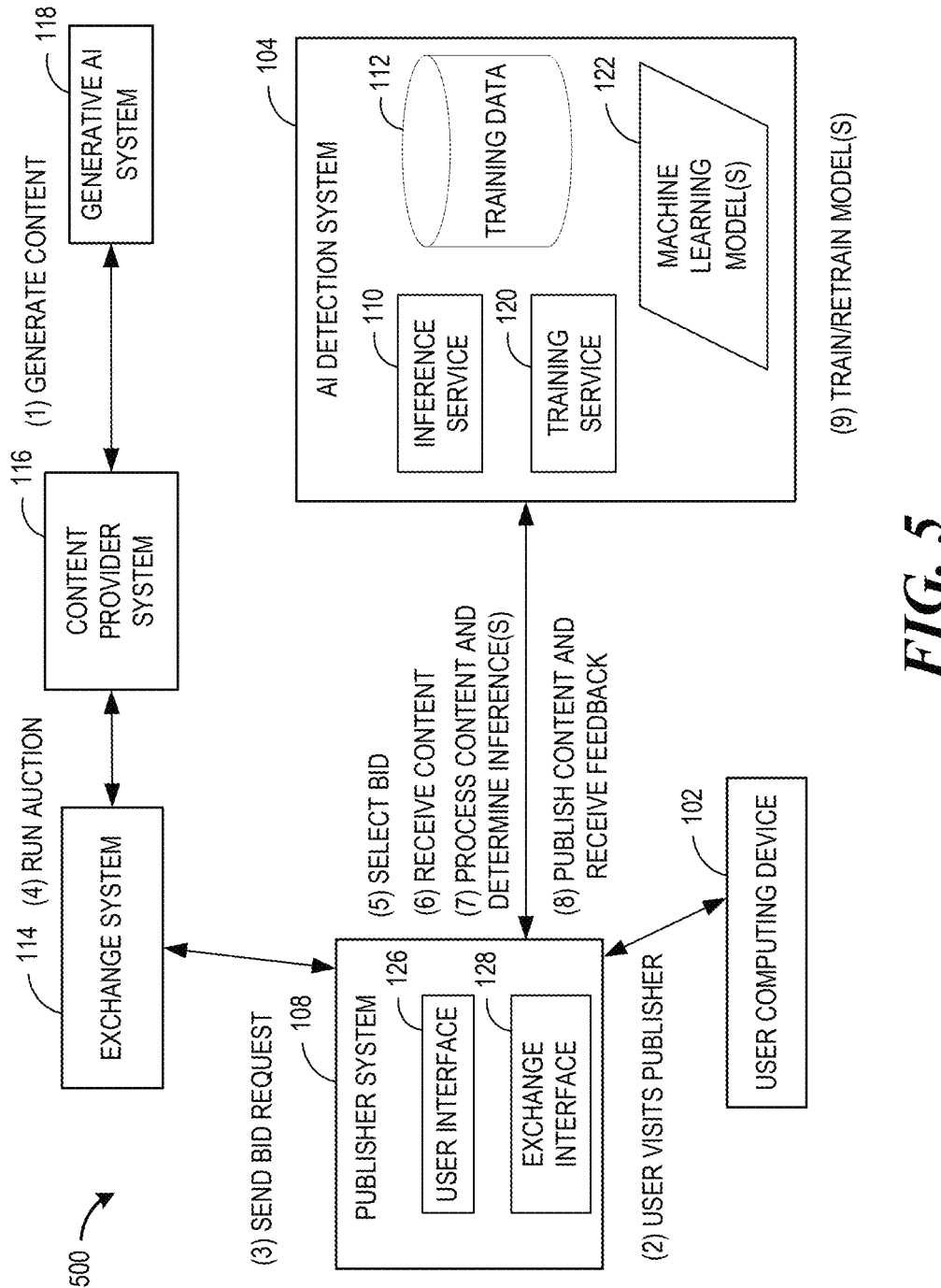
FIG. 5 is a flow diagram depicting illustrative interactions of an exchange network.

FIG. 5 is a flow diagram depicting illustrative interactions of an exchange network 500. As described herein, under programmatic advertising, there can be indirect transactions where the publisher, if it does not sell enough direct advertisements itself, can offer its supply to indirect demand sources in an open auction exchange in the exchange network 500. When a publisher decides to run a programmatic indirect impression, aspects of the advertising content may be, for one or more reasons, undesirable for the publisher's end-consumer. Due to the nature of programmatic, indirect advertising, there can be a lack of transparency between advertiser and publisher. In many systems, publishers have to trust that the advertising content is not harmful or misleading to the end-user. As described herein, in the exchange network 500, the AI detection system 104 can process the content to determine a likelihood that the content was generated by AI and/or determine a likelihood that content 310 contains a flaggable claim to address the foregoing issues.

The exchange network 500 can be implemented in the environment 100 of FIG. 1. The exchange network 500 include the user computing device 102, the publisher system 108, an exchange system 114, the content provider system 116, the generative AI system 118, and the AI detection system 104. At (1), content can be generated. A content provider can generate content with one or more generative AI systems 118. For example, the generated content can be the the content 310 from FIG. 3. As described herein, the content provider system 116 can receive some information (such as geolocation data, recent purchases, recent navigation data, etc.) about a user profile associated with an identifier (such as a cookie identifier or an IP address). The content provider system 116 can use the information associated with the user profile to generate content tailored for the user profile using generative AI. For example, the content provider system 116 can generate content based on a user profile's geolocation data. In one example, a generative AI system 118 can receive the end-user's geolocation (via an IP address) to customize fake news about riots/unrest to influence the user into purchasing a home defense product. In another example, a generative AI system 118 can be prompted to generate content regarding a skin care advertisement that is directed towards the users of a popular application based on information that the user profile has accessed that application and may be interested in skin care based on their browsing history.

At (2), the user computing device 102 can access the user interface 126 of the publisher system 108. At (3), in response to the user visit, the exchange interface 128 can generate a bid request and can send the bid request to the exchange system 114. In some embodiments, such as where the user profile associated with the user computing device 102 has consented to personalized content, the bid request can include an identifier for the user profile and/or the user computing device 102. At (4), the exchange system 114 runs an auction and can solicit one or more content provider systems 116 for indirect bids for the bid request. The content provider system 116, receiving the auction notification can bid in the auction. In some embodiments, if the bid request includes an identifier for the user profile or user computing device, the content provider system 116 can determine to bid based on the existence for targeted content generated for the user profile/user computing device. At (5), the publisher system 108 can select a bid. The publisher system 108 can instruct the exchange system 114 that the bid was selected, which in turn can cause the exchange system 114 to request the content and any associated metadata from the content provider system 116 that won the bid. At (6), the content provider system 116 can provide the generated content and metadata to the publisher system 108 via the exchange system 114. If the bid request included an identifier for the user profile or user computing device, then content provider system 116 can select the generated content for the user profile/user computing device. The publisher system 108 can provide the content and associated metadata to the AI detection system 104.

At (7), the AI detection system 104 processes the content and can make one or more inferences. In the case of image content, the inference service 110 can process the image content by extracting text with OCR technology from the image. The inference service 110 can also extract text data from other content in other formats, such as content in an audio, video, and/or markup format. The inference service 110 can apply a first machine learning model 122 to the text and the first machine learning model 122 can output a likelihood of whether the text was generated by AI. The inference service 110 can apply a second machine learning model 122 to the text and the second machine learning model 122 can output a likelihood of whether the text contains a flaggable claim. For example, the second machine learning model 122 can output a likelihood of whether the text contains a false claim, a likelihood of whether the text contains a misleading claim, a likelihood of whether the text contains an opinion claim, and/or a likelihood of whether the text lacks false/misleading/opinion claims. The inference service 110 can apply a third machine learning model 122 to the text and the third machine learning model 122 can output classification likelihood(s) that the text is related to one or more categories or sub-categories. The AI detection system 104 can generate structured data based on the determined likelihoods. For example, if the likelihoods satisfy or fail to satisfy a respective threshold, the structured data can include, but is not limited to, an indicator that the content was possibly generated by AI, an indicator that the content possibly included a flaggable claim, an indicator that the derived category does not match a provided category, etc. The AI detection system 104 can provide the structured data to the publisher system 108. In other embodiments, the AI detection system 104 can provide the one or more likelihoods to the publisher system 108.

At (8), the publisher system 108 can publish the content. As described herein, the user interface 126 can present the content and one or more indicators according to the structured data and/or the likelihoods. Accordingly, the user can be informed that the content was potentially generated by AI and/or potentially has a flaggable claim. In other cases or embodiments, the publisher system 108 can reject the content based on the structured data or the likelihoods and request a different bid. The publisher system 108 is also capable of receiving end-user feedback associated with the content. For example, especially if the structured data does not include a negative indicator, then the end-user feedback can indicate whether the content was possibly generated by AI, possibly containing a false, misleading, or opinion claim, possibly being custom generated content, and/or possibly being unauthorized. The publisher system 108 can provide the end-user feedback to the AI detection system 104. Additionally or alternatively, while not illustrated, the AI detection system 104 can receive feedback from the exchange system 114. For example, in some cases, feedback directly from the publisher system 108 may not be available but instead feedback metadata can be provided to the exchange system 114.

At (9), one or more of the machine learning models 122 can be trained or retrained with the training data 112, which can include the end-user feedback. For example, if a user indicates that the content was possibly generated by AI or possibly contains a flaggable claim, then the current content can be added to the training data 112 for further training with a corresponding training label. In the case of reported unauthorized content or reported custom generated content, a reviewing analyst can use those reports to potentially flag the corresponding content as generated by AI and included in subsequent training data. Accordingly, the training service 120 can generate improved machine learning models 122 with updated training data based on the user feedback.

Figure 6:
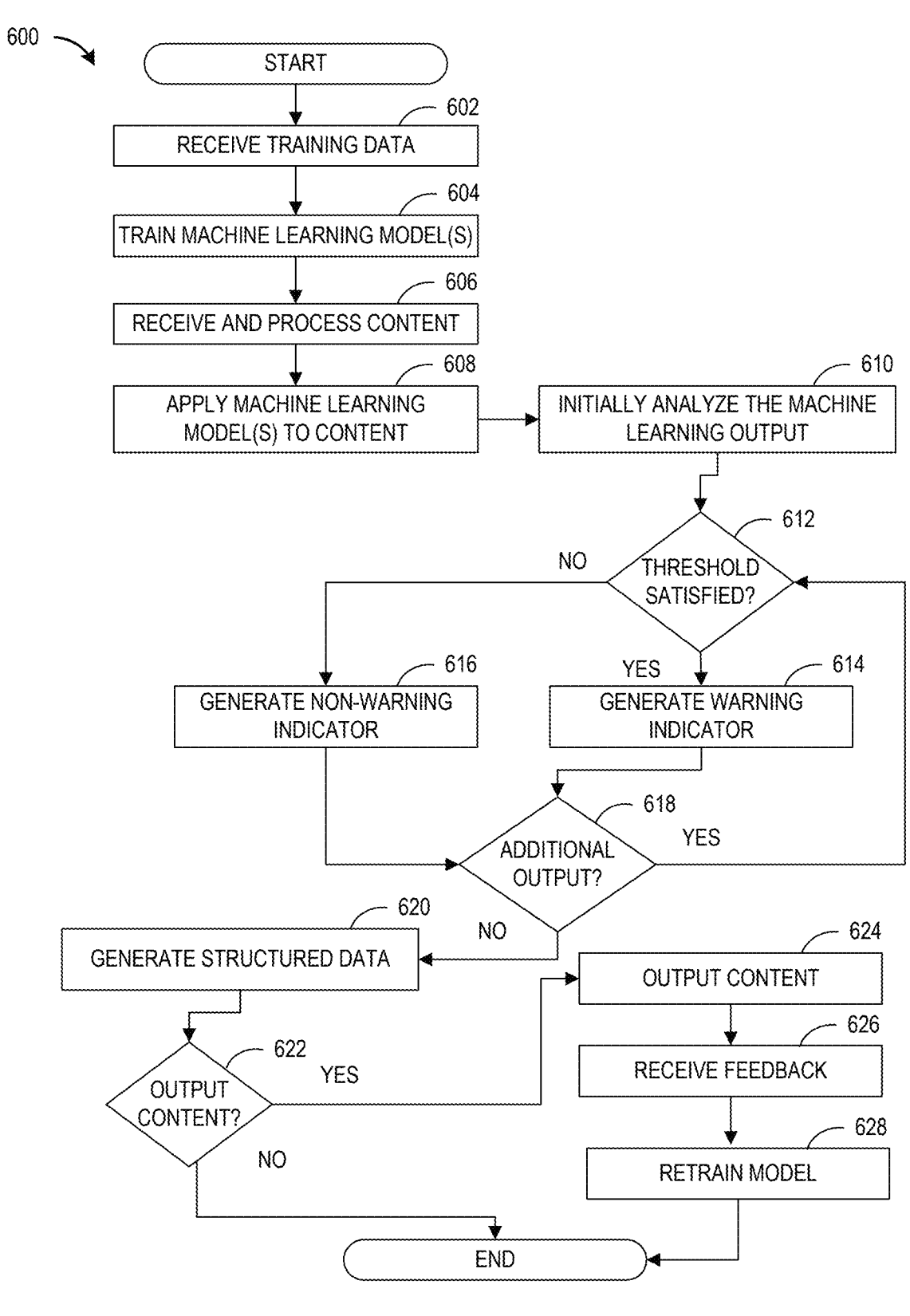
FIG. 6 is a flow chart depicting a method implemented by the AI detection system for detecting and/or labelling content as potentially generated by AI and/or flagged.

FIG. 6 includes a flow chart depicting a computer-implemented method 600 for detecting and/or labelling content as potentially generated by AI and/or flagged. The method 600 for analyzing content and determining a likelihood that the content was generated by AI and/or contains a flaggable claim may not have been available in some existing systems. The predictions of the AI detection system 104 can be surfaced to users and the AI detection system 104 can receive feedback on the predictions, which can be used to improve the machine learning models.

As described herein, the AI detection system 104, which includes the inference service 110 and the training service 120, may be implemented with the computing device 201 of FIG. 2. In some embodiments, the computing device 201 may include the inference application 222 and/or the training application 224 each of which may implement aspects of the method 600. Some aspects of the method 600 may be implemented by the publisher system 108. Moreover, some aspects of the method 600 may be described above with respect to FIG. 5.

Beginning at block 602, training data can be received. The training service 120 can receive the training data from one or more sources, such as, but not limited to, the trusted source 124. As described herein, the trusted source 124 can include an encyclopedic database. The training data can contain text data labelled as true claims, which can be derived from data sources such as the encyclopedic database. The training data can also contain text data that is labelled with a flaggable claim, such as, but not limited to, a misleading, false, or opinion claim. In some embodiments, a flaggable claim could also be a positive, truthful, or helpful claim. As described herein, the training data can be labelled by an analyst. The training data can also include image data, text data, markup data, video data, or audio data labelled either as generated by AI or not generated by AI. The training data can be in an unstructured and/or a structured format. As described herein, the training service 120 can receive content credentials (such as a Content Authenticity Initiative credential) associated with content in the training data. The training service 120 can verify, via the content credential, that the content was not generated by AI and the content can be included in the training data with a corresponding label.

At block 604, one or more machine learning models can be trained. The training service 120 can train an initial machine learning model with the training data. As described herein, the training service 120 can train different machine learning models for different purposes. The training service 120 can train machine learning models for AI-generated content detection. For example, in the context of text data, generative models may be trained for language prediction to determine which word should be next and, therefore, AI-generated text content can frequently reuse common terms such as "the," "it," or "is" instead of less common terms. In an image or video context, AI generated image or video can include a fuzziness or picture quality that can be distinctive of AI generated image or video. The machine learning models can be trained to detect these patterns and output inferences accordingly. Depending on the type of machine learning model, the machine learning model can receive input based at least in part on image data, text data, markup data, video data, or audio data and corresponding training labels. For example, the training service 120 can convert the image data, text data, markup data, video data, or audio data to vector data. The training service 120 can train machine learning models for determining a likelihood that text data contains a flaggable claim (such as a misleading, false, or opinion claim) based on labelled text data (such as a true, misleading, false, or opinion label).

In a training data set, a first label can indicate that first content was generated by AI and the second label can indicate that second content was not generated by AI. In particular, a first label can indicate that first text data was generated by AI and the second label can indicate that second text data was not generated by AI. In another training data set, a first label can indicate that first image data was generated by AI and the second label can indicate that second image data was not generated by AI. In another training data set, a first label can indicate that first markup data was generated by AI and the second label can indicate that the second markup data was not generated by AI. In another training data set, the labels can include a first label that some text data includes a flaggable claim (such as a false, misleading, or opinion claim) and a second label that indicates that some text data does not include a flaggable claim (such as a false, misleading, or opinion claim).

The machine learning model can include a neural network. During training, the training service 120 can determine a loss and a gradient of the neural network and update, based at least in part on the loss and the gradient, a weight, or a bias of the neural network. As described herein, image, video, or audio identification models can include, but are not limited to, CNN or RNN models. For natural language processing models (such as those that process text data), the natural language processing model can include, but is not limited to, a BERT model.

In some embodiments, the training service 120 can train a machine learning model to determine a derived category for text data. As described herein, provided content can be associated with a category. For example, the advertising content can be associated with an Interactive Advertising Bureau (IAB) category taxonomy. The training service 120 can train a machine learning model with training data that is labelled with different categories or sub-categories. The machine learning model can be a natural language processing model, such as, but not limited to, a BERT model.

At block 606, content can be received and processed. The inference service 110 can receive content from the publisher system 108. The content can include image data, text data, markup data, video data, and/or audio data. In some embodiments, the content can include code instructions, such as JavaScript. The inference service 110 can also receive metadata associated with the content, such as, but not limited to a category for the content. As described herein, the publisher system 108 can receive advertising content via an advertising exchange. For content that includes image data, the inference service 110 can perform an optical character recognition operation on the image data that results in text data. The inference service 110 can extract text or otherwise determine text from other types of content, such as, audio, video, markup content types and/or code instructions. In the case of markup content, the inference service 110 can parse the markup language and extract text content from elements within the markup content. In the case of code instructions, the inference service 110 can evaluate the code instructions to determine text data that would be presented by the code instructions. In some embodiments, the inference service 110 can apply robotic process automation (RPA), which can also be referred to as software robots, to programmatically extract metadata from the content.

At block 608, one or more machine learning models can be applied to input based at least in part on the content. The inference service 110 can apply one or more machine learning models to input based at least in part on the image data, text data, video data, and/or audio data. For example, the inference service 110 can convert the image data, text data, markup data, video data, or audio data to vector data. The inference service 110 can apply a first machine learning model to input based at least in part on the text data, where the first machine learning model outputs a likelihood that the text data was generated by AI. The inference service 110 can apply a second machine learning model to input based at least in part on the text data, where the second machine learning model outputs a likelihood that the text data includes a flaggable claim (such as a false, misleading, or an opinion claim, a positive claim, a helpful claim, etc.). The inference service 110 can apply a third machine learning model to input based at least in part on the text data, where the third machine learning model outputs a derived category for the text data. The inference service 110 can apply a fourth machine learning model to input based at least in part on the image data, where the fourth machine learning model outputs a likelihood that the image data was generated by AI. The inference service 110 can apply a machine learning model to input based at least in part on the content (such as markup data, video data, or audio data), wherein the machine learning model outputs a likelihood that the content was generated by AI. As described above in the previous block 606, the inference service 110 can extract text from other types of content, such as, audio, video, or markup content types. In some embodiments, the inference service 110 can apply machine learning model on the extracted text.

At block 610, the machine learning output can be initially analyzed. The inference service 110 can process the inferences from the machine learning model(s), such as, but not limited to, categories or likelihoods output by the models. For example, the inference service 110 can determine that a derived category does not match the category provided for the content. In some embodiments, matching can be an exact match, such as where the provided category and the derived category following the same category standard (such as Interactive Advertising Bureau (IAB) category values). Additionally or alternatively, the inference service 110 can determine that the provided category and the derived category match with natural language processing where the category values may not be identical but rather may be synonymous. Additional machine learning output analysis is described herein, such as with respect to the below block 612 for analyzing the likelihood values.

At block 612, it can be determined whether the likelihood values satisfy a threshold. For each likelihood output of each applied machine learning model, the inference service 110 can compare each likelihood to a threshold (such as a probability threshold), which can vary per model and/or publisher. As described herein, the likelihoods can indicate the probability that content was possibly generated by AI and/or includes a flaggable claim. If the likelihood satisfies a threshold, the method 600 can proceed to block 614 for generating a warning indicator. If the likelihood fails to satisfy the threshold, the method 600 can proceed to block 616 for generating a regular indicator.

At block 614, a warning indicator can be generated. The inference service 110 can generate an indicator that the content was possibly generated by AI (such as a text value or numerical value that indicates "possibly generated by AI"). The inference service 110 can generate an indicator that the content possibly includes a flaggable claim. For example, the inference service 110 can generate an indicator that the content possibly includes a false, misleading, or opinion claim (such as a text value or numerical value that indicates "false claim," "misleading claim," or "opinion claim"). The inference service 110 can generate an indicator that that the category for the content does not match the derived category (such as "exercise!=security").

At block 616 a non-warning indicator can be generated. The inference service 110 can generate an indicator that the content was possibly not generated by AI (such as a text value or numerical value that indicates "no indication of AI used"). The inference service 110 can generate an indicator that the content possibly does not include a flaggable claim. For example, the inference service 110 can generate an indicator that the content possibly does not include false, misleading, or opinion claims (such as a text value or numerical value that indicates "content is factually correct"). The inference service 110 can generate an indicator that that the category for the content matches the derived category (such as "drink==drink").

At block 618, it can be determined whether there is additional output for processing. The inference service 110 can determine whether there is additional output from the machine learning models. If there is additional output, the method 600 can return to block 612 to determine if the additional output satisfies a threshold. If the additional output does not exist, the method 600 can return to block proceed to block 620 to generate structured data.

At block 620, structured data can be generated. The inference service 110 can generate structured data from the indicators. For example, the inference service 110 can generate structured data with (i) a first indicator that the first content was possibly generated by AI, (ii) a second indicator that the first content possibly includes the flaggable claim (such as a false, misleading, or opinion claim), and/or (iii) a third indicator that the category for the first content does not match the derived category. In some embodiments, the structured data can include indicators a risk score and/or the likelihood values. In some embodiments, the inference service 110 can generate a risk score, which can be based on one or more of the likelihoods. The inference service 110 can include the risk score and/or the likelihood values in the structured data. For example, a risk score can be a numerical score and/or a level (such as low risk, medium risk, high risk). In some embodiments, the risk score can represent a combination of multiple likelihoods. For example, inference service 110 can assign a high risk score to content if the generated-by-AI likelihood satisfies a threshold and the flaggable-claim likelihood satisfies a threshold. The inference service 110 can generate different structured data based on the particular output for specific content. In some embodiments, the structured data can be in a JavaScript Object Notation (JSON) format.

At block 622, it can be determined whether to cause presentation of the content. The inference service 110 and/or the publisher system 108 can determine whether to cause presentation of the content. In some embodiments, if there is a possibly-generated-by-AI indicator or a possibly-flaggable-claim indicator (such as a possibly-misleading-false-or-opinion-claim indicator), then the publisher system 108 can determine to prevent the content from being presented, i.e., block the content. In other embodiments, the publisher system 108 can determine not to present the content if the likelihood score and/or a risk score satisfies a threshold. Additionally or alternatively, such as depending on the type of or configuration of the publisher system 108, the publisher system 108 can determine to present the content with warning(s) and proceed to block 624. The content can also be flagged for manual review based on any warning indicators.

At block 624, the content can be output. The publisher system 108 can cause ouptut of the content via a user interface, such as presentation of the output in a graphical user interface. The publisher system 108 can cause the output of the one or more indicators via the user interface. Additional details regarding indicators and graphical user interfaces are described herein, such as with respect to FIGS. 4A-4B. Accordingly, a user can be informed of whether the content was possibly generated by AI or possibly contains a flaggable claim (such as a false/misleading/or opinion claim).

At block 626, feedback can be received. The user interface 126 of the publisher system 108 can receive feedback regarding the content. For example, for content that was initially identified as not being AI generated, a user can view the content and determine that the content was possibly generated by AI and flag it as such. The user interface 126 can receive user input reporting that content as possibly generated by AI. As another example, for content that was initially identified as not containing a false, misleading, or opinion claim, a user can view the content and determine that the content contains a false, misleading, or opinion claim. As described herein, user feedback can also include feedback that the content was possibly custom generated content, and/or possibly unauthorized, which can be indirect feedback that the content was possibly generated by AI. In some embodiments, the AI detection system 104 can receive feedback from the exchange system 114. As described herein, in some cases, feedback directly from the publisher system 108 may not be available but instead feedback metadata can be available from the exchange system 114. An analyst can review the user feedback and corresponding content and identify additional content to be used in updated training data. The training service can generate updated training data that includes the content that recently received user feedback and a label based on the user feedback.

At block 628, the one or more machine learning models can be trained or retrained. The training service 120 can train or retrain a machine learning model with the updated training data. To train or retrain the machine learning model, the training service 120 can determine a loss and a gradient of a neural network, and update, based at least in part on the loss and the gradient, a weight or a bias of the neural network that results in an updated machine learning model. Accordingly, the publisher system 108 and the AI detection system 104 can form a feedback loop to improve the detection machine learning models.

As used herein, a "user interface" can refer to a point of human-computer interaction. The user interface can be graphical user interface. In other embodiments, the user interface can output audio or haptic signals.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising." "including." "having." and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:

receiving (1) first content for presentation comprising image data and (2) metadata associated with the first content, wherein the metadata comprises a category for the first content;

performing an optical character recognition operation on the image data that results in text data;

applying a first machine learning model to first input based at least in part on the text data, wherein the first machine learning model outputs a first likelihood that the text data was generated by artificial intelligence (AI);

applying a second machine learning model to second input based at least in part on the text data, wherein the second machine learning model outputs a second likelihood that the text data includes a false, misleading, or opinion claim;

applying a third machine learning model to third input based at least in part on the text data, wherein the third machine learning model outputs a derived category for the text data;

determining that the first likelihood satisfies a first threshold;

determining that the second likelihood satisfies a second threshold;

determining that the category for the first content does not match the derived category;

generating structured data, wherein the structured data comprises (i) a first indicator that the first content was possibly generated by AI, (ii) a second indicator that the first content possibly includes the false, misleading, or opinion claim, and (iii) a third indicator that the category for the first content does not match the derived category;

presenting, via a graphical user interface, the first content; and presenting, via the graphical user interface, the first indicator, the second indicator, and the third indicator.

2. The computer-implemented method of claim 1, further comprising:

training an initial machine learning model with training data comprising first text data, a first label for the first text data, second text data, and a second label for the second text data, wherein the first label indicates that the first text data was generated by AI and the second label indicates that the second text data was not generated by AI, and wherein training the initial machine learning model further comprises:

determining a loss and a gradient of a neural network; and updating, based at least in part on the loss and the gradient, a weight or a bias of the neural network that results in the first machine learning model.

3. The computer-implemented method of claim 2, further comprising:

receiving a content credential associated with the second text data; and verifying, via the content credential, that the second text data was not generated by AI.

4. The computer-implemented method of claim 1, further comprising:

training an initial machine learning model with training data comprising first text data, a first label for the first text data, second text data, and a second label for the second text data, wherein the first label indicates that the first text data includes a false, misleading, or opinion claim and the second label indicates that the second text data does not include a false, misleading, or opinion claim, and wherein training the initial machine learning model further comprises:

determining a loss and a gradient of a neural network; and updating, based at least in part on the loss and the gradient, a weight or a bias of the neural network that results in the second machine learning model.

5. The computer-implemented method of claim 4, further comprising:

obtaining, from an encyclopedic database, the second text data.

6. The computer-implemented method of claim 1, further comprising:

training an initial machine learning model with training data comprising first text data, a first label for the first text data, second text data, and a second label for the second text data, wherein the first label indicates a first category and the second label indicates a second category, and wherein training the initial machine learning model further comprises:

determining a loss and a gradient of a neural network; and updating, based at least in part on the loss and the gradient, a weight or a bias of the neural network that results in the third machine learning model.

7. A system comprising:

a non-transitory computer-readable medium to store computer-executable instructions; and a computer hardware processor in communication with the non-transitory computer-readable medium, wherein the computer hardware processor executes the computer-executable instructions to at least:

receive first content for presentation comprising image data;

perform an optical character recognition operation on the image data that results in text data;

apply a first machine learning model to first input based at least in part on the image data, wherein the first machine learning model outputs a first likelihood that the image data was generated by artificial intelligence (AI);

apply a second machine learning model to second input based at least in part on the text data, wherein the second machine learning model outputs a second likelihood that the text data includes a flaggable claim;

determine that the first likelihood satisfies a first threshold;

determine that the second likelihood satisfies a second threshold;

generate structured data, wherein the structured data comprises (i) a first indicator that the first content was possibly generated by AI, and (ii) a second indicator that the first content possibly includes the flaggable claim;

present, via a graphical user interface, the first content; and present, via the graphical user interface, the first indicator and the second indicator.

8. The system of claim 7, wherein the computer hardware processor executes additional computer-executable instructions to at least:

train an initial machine learning model with training data comprising first image data, a first label for the first image data, second image data, and a second label for the second image data, wherein the first label indicates that the first image data was generated by AI and the second label indicates that the second image data was not generated by AI, and wherein to train the initial machine learning model, the computer hardware processor executes the additional computer-executable instructions to at least:

determine a loss and a gradient of a neural network; and update, based at least in part on the loss and the gradient, a weight or a bias of the neural network that results in the first machine learning model.

9. The system of claim 8, wherein the computer hardware processor executes further computer-executable instructions to at least:

receive a content credential associated with the second image data; and verify, via the content credential, that the second image data was not generated by AI.

10. The system of claim 7, wherein the computer hardware processor executes additional computer-executable instructions to at least:

present, in a graphical user interface, second content; and receive, via the graphical user interface, user input reporting the second content as possibly generated by AI.

11. The system of claim 10, wherein the computer hardware processor executes further computer-executable instructions to at least:

generate training data comprising the second content and a label for the second content, wherein the label indicates that the second content was generated by AI; and train an initial machine learning model with the training data, wherein to train the initial machine learning model, the computer hardware processor executes the further computer-executable instructions to at least:

determine a loss and a gradient of a neural network; and update, based at least in part on the loss and the gradient, a weight or a bias of the neural network that results in an updated first machine learning model.

12. The system of claim 7, wherein the computer hardware processor executes additional computer-executable instructions to at least:

apply a third machine learning model to third input based at least in part on the text data, wherein the third machine learning model outputs a third likelihood that the text data was generated by AI;

determine that the third likelihood satisfies a third threshold; and present, via the graphical user interface, a third indicator that the text data was possibly generated by AI.

13. The system of claim 7, wherein the computer hardware processor executes additional computer-executable instructions to at least:

apply a third machine learning model to third input based at least in part on the text data, wherein the third machine learning model outputs a derived category for the text data;

determine that a category for the first content does not match the derived category; and present, via the graphical user interface, a third indicator that the category for the first content does not match the derived category.

14. A non-transitory computer-readable storage medium storing computer-executable instructions that when executed by one or more computer hardware processors perform operations comprising:

receiving first content for presentation comprising image data;

performing an optical character recognition operation on the image data that results in text data;

applying a first machine learning model to first input based at least in part on the image data, wherein the first machine learning model outputs a first likelihood that the image data was generated by artificial intelligence (AI);

applying a second machine learning model to second input based at least in part on the text data, wherein the second machine learning model outputs a second likelihood that the text data includes a flaggable claim;

determining that the first likelihood satisfies a first threshold;

determining that the second likelihood satisfies a second threshold;

generating structured data, wherein the structured data comprises (i) a first indicator that the first content was possibly generated by AI, and (ii) a second indicator that the first content possibly includes the flaggable claim;

presenting, via a graphical user interface, the first content; and presenting, via the graphical user interface, the first indicator and the second indicator.

15. The non-transitory computer-readable storage medium of claim 14, wherein the one or more computer hardware processors perform further operations comprising:

training an initial machine learning model with training data comprising first image data, a first label for the first image data, second image data, and a second label for the second image data, wherein the first label indicates that the first image data was generated by AI and the second label indicates that the second image data was not generated by AI, and wherein training the initial machine learning model further comprises:

determining a loss and a gradient of a neural network; and updating, based at least in part on the loss and the gradient, a weight or a bias of the neural network that results in the first machine learning model.

16. The non-transitory computer-readable storage medium of claim 15, wherein the one or more computer hardware processors perform additional operations comprising:

receiving a content credential associated with the second image data; and verifying, via the content credential, that the second image data was not generated by AI.

17. The non-transitory computer-readable storage medium of claim 14, wherein the one or more computer hardware processors perform further operations comprising:

presenting, in a graphical user interface, second content; and receiving, via the graphical user interface, user input reporting the second content as possibly generated by AI.

18. The non-transitory computer-readable storage medium of claim 17, wherein the one or more computer hardware processors perform further operations comprising:

generating training data comprising the second content and a label for the second content, wherein the label indicates that the second content was generated by AI; and training an initial machine learning model with the training data, wherein training the initial machine learning model further comprises:

determining a loss and a gradient of a neural network; and updating, based at least in part on the loss and the gradient, a weight or a bias of the neural network that results in an updated first machine learning model.

19. The non-transitory computer-readable storage medium of claim 14, wherein the one or more computer hardware processors perform further operations comprising:

applying a third machine learning model to third input based at least in part on the text data, wherein the third machine learning model outputs a third likelihood that the text data was generated by AI;

determining that the third likelihood satisfies a third threshold; and presenting, via the graphical user interface, a third indicator that the text data was possibly generated by AI.

20. The non-transitory computer-readable storage medium of claim 14, wherein the one or more computer hardware processors perform further operations comprising:

applying a third machine learning model to third input based at least in part on the text data, wherein the third machine learning model outputs a derived category for the text data;

determining that a category for the first content does not match the derived category; and presenting, via the graphical user interface, a third indicator that the category for the first content does not match the derived category.

* * * * *